US008972927B2

(12) United States Patent
Solovey et al.

(10) Patent No.: US 8,972,927 B2
(45) Date of Patent: Mar. 3, 2015

(54) METHOD AND SYSTEM FOR PROVIDING MODELED COMPONENTS

(75) Inventors: Edward Solovey, Brookline, MA (US); Basil C. Hosmer, Winchester, MA (US)

(73) Assignee: Adobe Systems Incorporated, San Jose, CA (US)

( * ) Notice: Subject to any disclaimer, the term of this patent is extended or adjusted under 35 U.S.C. 154(b) by 1230 days.

(21) Appl. No.: 12/567,594

(22) Filed: Sep. 25, 2009

(65) Prior Publication Data

US 2014/0033168 A1    Jan. 30, 2014

(51) Int. Cl.
*G06F 9/44*    (2006.01)
*G06F 3/00*    (2006.01)

(52) U.S. Cl.
USPC .......................................... 717/104; 715/762

(58) Field of Classification Search
USPC ........................................................ 717/104
See application file for complete search history.

(56) References Cited

U.S. PATENT DOCUMENTS

| 5,764,226 | A  | * | 6/1998 | Consolatti et al. | 715/747 |
| 6,184,879 | B1 | * | 2/2001 | Minemura et al. | 715/762 |
| 7,930,343 | B2 | * | 4/2011 | Zhang et al. | 709/203 |
| 2005/0015745 | A1 | * | 1/2005 | Wain et al. | 717/105 |
| 2005/0060317 | A1 | * | 3/2005 | Lott et al. | 715/532 |
| 2006/0064669 | A1 | * | 3/2006 | Ogilvie et al. | 717/106 |
| 2008/0162548 | A1 | * | 7/2008 | Ahmed et al. | 707/103 R |
| 2010/0153909 | A1 | * | 6/2010 | Batey et al. | 717/104 |
| 2010/0313181 | A1 | * | 12/2010 | Fernandez et al. | 717/107 |
| 2011/0035732 | A1 | * | 2/2011 | Crisman | 717/140 |

OTHER PUBLICATIONS

Childs et al., "Calm and Cadena: Metamodeling for Component-Based Product-Line Development," IEEE, 2006, 9pg.*
Coulson et al., "A Generic Component Model for Building Systems Software," ACM, 2008, 42pg.*
Egyed et al., "Component-based perspective on software mismatch detection and resolution," IEEE, 2000, 14pg.*
Perez-Martinez, Jorge Enrique, "Heavyweight extensions to the UML metamodel to describe the C3 architectural style," ACM, 2003, 6pg.*
IBM, "XML Builder for Faces Components," IP.com No. IPCOM000149853D, 2007, 4pg.*
"Adobe LiveCycle Data Services ES Developer's Guide", [Online], Retrieved from the Internet: <URL: http://help.adobe.com/en_US/livecycle/es/lcds_dev_guide.pdf>, (2007), 626 pgs.

* cited by examiner

*Primary Examiner* — Ryan Coyer
(74) *Attorney, Agent, or Firm* — Shook, Hardy & Bacon LLP

(57) ABSTRACT

A system for providing modeled components is described. An example system comprises a request detector, an entity component, a style component, and a property module. The request detector may be configured to receive requests to create modeled components. The entity builder may be configured to create entities associated with models. The styles designer may be configured to create style components. A style component defines a user interface to be applied to a property of an entity in a modeled component. The property module may be configured to associate a style component with one or more properties of one or more entities.

18 Claims, 6 Drawing Sheets

US 8,972,927 B2

METHOD AND SYSTEM FOR PROVIDING MODELED COMPONENTS

TECHNICAL FIELD

This disclosure relates generally to the technical fields of software and/or hardware technology and, in one example embodiment, to system and method for providing modeled components.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

In software engineering, a model comprises an abstract description of the software component(s) used by a software system of one or more applications, processes, or other functional units. A model can be defined using a modeling language that typically comprises a consistent set of rules used to interpret the syntax used to express the model. The model can formally define the structure and meaning of data.

Various modeling languages exist that allow for modeling of data and processes of an application. For example, Unified Modeling Language (UML) provides a graphical language for modeling various aspects of a software system. Code generation based on models, such as UML, can allow a skeleton or framework of source code to be produced based on model specifications. For example, the "employee model" may be used to generate the "Employee" class noted above or another logical expression of the employee component.

BRIEF DESCRIPTION OF DRAWINGS

Embodiments are illustrated by way of example and not limitation in the figures of the accompanying drawings, in which like references indicate similar elements and in which.

DETAILED DESCRIPTION

Figure 1:
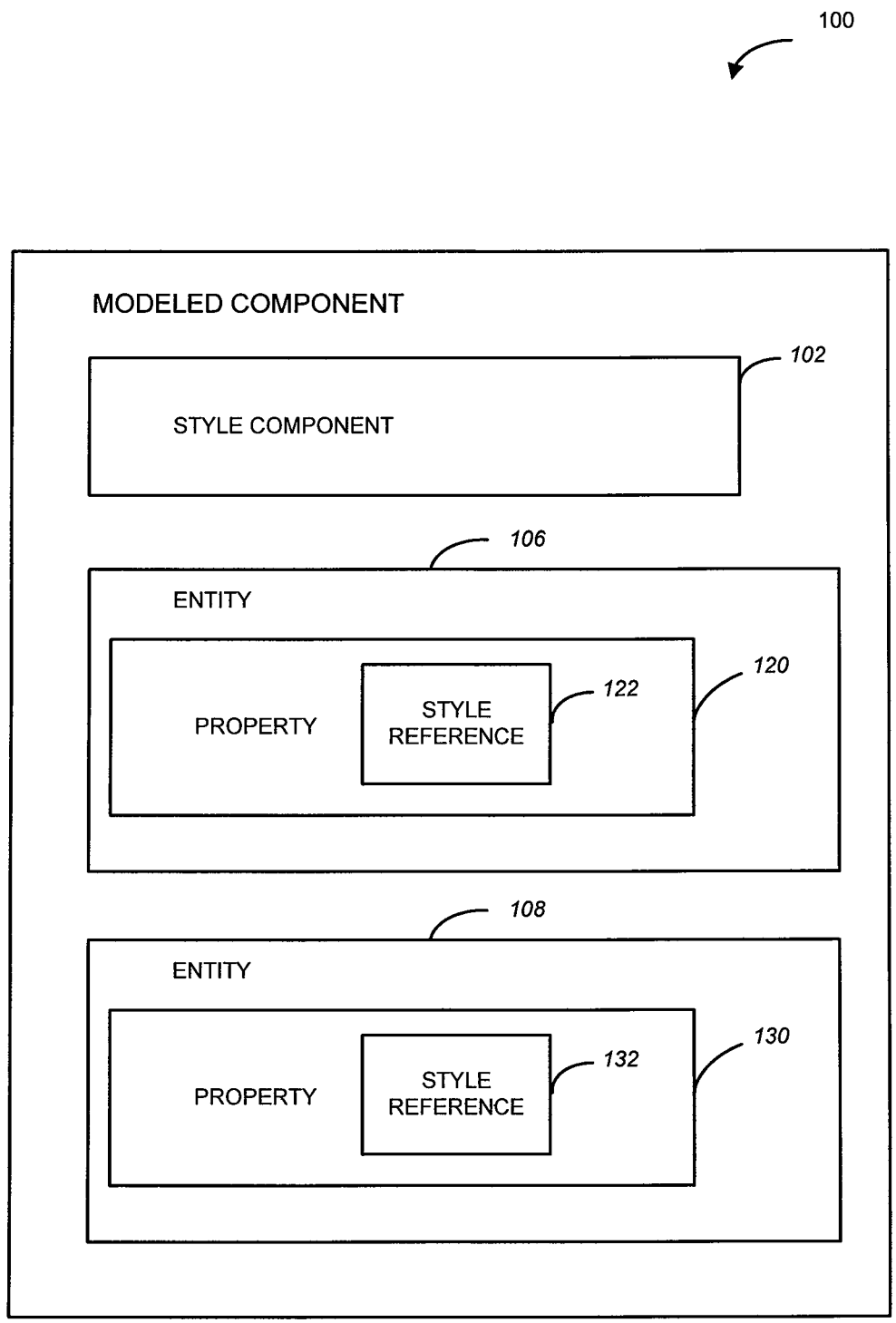
FIG. 1 is a graphical representation of a modeled component where a style component is specified at a model level, in accordance with an example embodiment.

In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

A suite of technologies that enables model-driven development of computing applications may include a data modeling language, tools for working with data models and associated code-generation, and runtime environment for the modeling language. An example data modeling language is an XML-based language that allows developers to define entities, associations between entities, and behaviors of entities. XML is the abbreviation for Extensible Markup Language. A modeling editor may be configured for creating and manipulating data models, as well as for deploying data models to a data services server, and may be termed a modeler module (or modeler). A data model, in one embodiment, may define one or more entities, where each entity represents a custom data type. An entity comprises one or more data properties that may correspond to persistent storage or may define expressions. An example of an entity representing an applicant component is shown below in Table 1.

TABLE 1

<model xmlns="http://ns.adobe.com/Fiber/0.3">
  <entity name="Applicant">

TABLE 1-continued

```
<property name="name" type="string"/>
<property name="ssn" type="string"/>
<property name="age" type="integer"/>
<property name="state" type="string"/>
</entity>
</model>
```

A modeler, in one example embodiment, may include a styles designer module for defining and utilizing style components (also referred to as merely styles) and make one or more styles available within a model. A style may be described as a collection of user-interface-related attributions (or aspects) that can be associated with a property element of an entity in a model. The association between a property of an entity and a style may be expressed by defining or referencing the style component in the style attribute of a property element. The information that may be expressed by a style component may include various aspects such as, e.g., a set of property level validity expressions, an open-ended set of localizable message expressions (e.g., captions, descriptions, hover text, speak text, etc. . . . ), and masking expressions (e.g., edit and display masks).

A graphical representation of a modeled component where a style component is specified at an entity level (as an immediate child of the model) and then used as an attribute of a property of an entity is provided in FIG. 1. As shown in FIG. 1, a modeled component 100 includes a style component 102 that is defined at a level of the model, as a direct child of the modeled component, and an entity component 106. The entity component 106 includes a property 120 that references the style defined by the style component 102, as indicated by a style reference 122. The modeled component 100 also includes an entity component 108. The entity component 108 includes a property 130 that also references the style defined by the style component 102, as indicated by a style reference 132.

Figure 2:
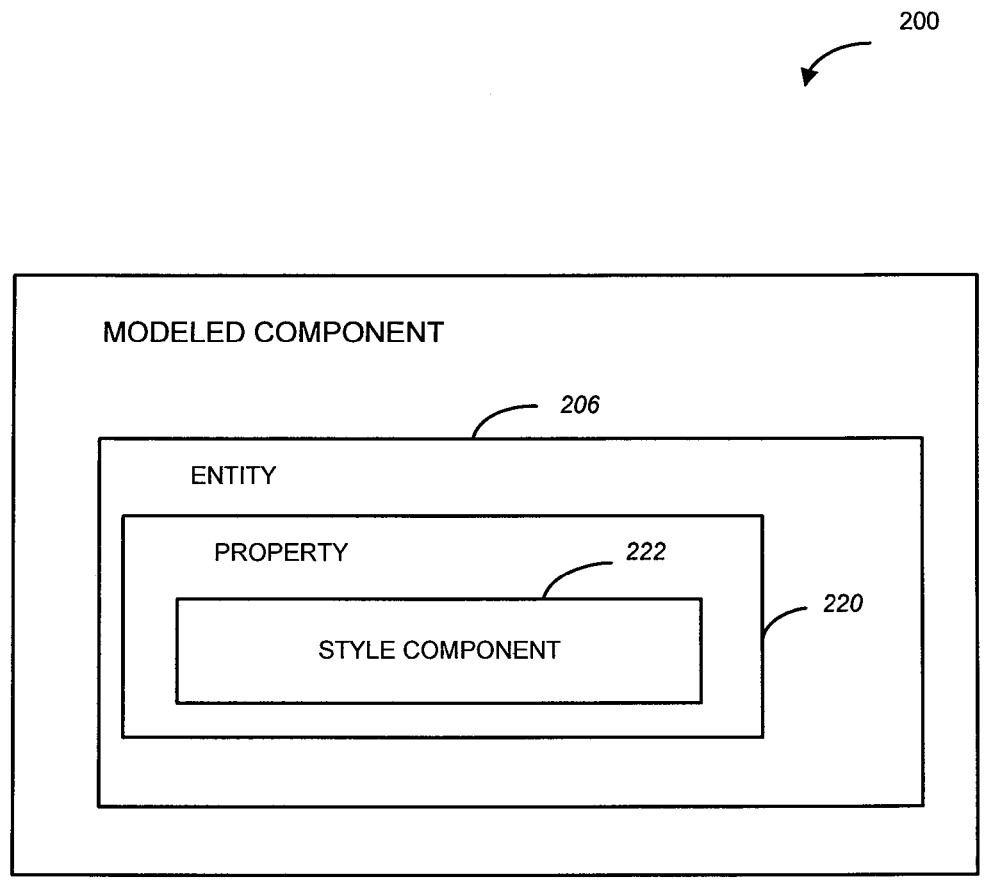
FIG. 2 is a graphical representation of a modeled component where a style component is specified at a property level, in accordance with an example embodiment.

An example of a style component specified at a property level, where a style component appears as an immediate child of a property, is shown in FIG. 2. In FIG. 2, a modeled component 200 includes, as a child, an entity 206. The entity 206 includes a property 220 that, in turn, includes a style component 222. While in FIG. 1, the style component 102 is specified at a model level and referenced at a property level, in FIG. 2 the style component 222 is specified at a property level.

An example of specifying a style component at a model level is shown below in Table 2. As shown in Table 2, the property of the "ContactInfo" entity has attributes (or aspects), such as name, type, and style.

TABLE 2

```
<model xmlns="http://ns.adobe.com/Fiber/0.3">
    <style name="phoneNumberStyle">
        <edit-mask>
            <mask>'('999')'-999-9999</mask>
        </edit-mask>
    </style>
    <entity name="ContactInfo">
        <property name="phone-number" type="string" style="phoneNumberStyle"/>
    </entity>
</model>
```

An example of specifying a style component at a property level is shown below in Table 3.

TABLE 3

```
<model xmlns="http://ns.adobe.com/Fiber/0.3">
    <entity name="ContactInfo">
        <property name="phone-number" type="string"/>
            <style name="phoneNumberStyle">
                <edit-mask>
                    <mask>'('999')'-999-9999</mask>
                </edit-mask>
            </style>
        </property>
    </entity>
</model>
```

A style component may be defined to address various aspects of property level information. For example, a style may be designed to validate the value of a property in an entity (referred to as style validation), to provide a message to be displayed to a viewer with respect to a property, and to allow developers to associate masking expressions with a property. Masking expressions may be included, e.g., in an edit mask that specifies the set of acceptable input characters when the property is being modified, and in a display mask that specifies the format of the property when it is being displayed.

In one embodiment, validity expressions that may be provided by a style component support boolean validity expressions that can be applied at the property level. The scope for validity expressions provided by a style component is the property to which the style is being applied to. By utilizing style components, validity expressions may be specified at the model level and referenced in properties of multiple entities. For example, a style configured to determine whether a value is a positive integer may be specified at the top level of the model (as an immediate child of the model) and then applied to any property of any entity in the model, in order to validate the value of a property if it is a positive integer. When a style validity expression returns FALSE, it may be treated as an indication that the property that includes a reference to the associated style may need to be modified in order to resolve the validation.

An example of applying style validation to a property of an entity is shown below in Table 4. The example provided in Table 4, the "price" property is validated by applying to it the "priceValidation" style. When the value of the "price" property is not greater than zero, a message is generated that reads: "Price needs to be greater than zero." An expression in a validation aspect of a style component refers to the property to which the style is applied. A style validation defined by a style component may be applied to properties of multiple entities, e.g., by referencing the style component in those properties that are to be the subject of validation.

TABLE 4

```
<style name="priceValidation">
    <validation text="Price needs to be greater than zero">
        <expr><![CDATA[value > 0]]></expr>
    </validation>
</style>
<entity name="applicant">
    <property name="price" style="priceValidation" type="float">
        <annotation name="DMS">
            <item name="ColumnName">price</item>
        </annotation>
    </property>
</entity>
```

As mentioned above, a style may be designed to provide one or more messages to be displayed to a viewer with respect to a property attribute. This feature may be referred to as a style message feature. Message aspects provided in a style component may be used to aid designers to model multi-language applications. For designers not concerned with multi-language support, a message aspect may provide a convenient way to associate literal strings with properties. Like other style aspects, message aspects may aid easy message reuse across properties included in various entities of a model. For example, if multiple entities in a model include a last name property, the caption and description for the property may be specified only once by means of a style component at the model level and then referenced from respective "last name" properties at a property level. Specific message aspects such as, e.g., error messages may be used to specify validation failure messages for constraints included in a property.

An example of a style message feature is shown below in Table 5. The example provided in Table 5, shows a caption message example with static text value.

TABLE 5

```
<property name="productName" type="string" required="true"
length="40">
    <style>
        <message name="caption" text="Product"/>
    </style>
</property>
```

A message included in a style component may contain literal text (as shown in Table 5 above) or a reference to a localization resource. An example of using a style component that references a localization resource is shown below in Table 6.

TABLE 6

```
<entity name="Person">
    <property name="isDoctor" type="boolean"/>
    <variant selector="isDoctor">
        <case value="true">
            <property name="lastName"
            type="string">
                <style>
                    <message
                    name="caption"
                    bundle="PersonMessages"
                    key="doctor prefix"/>
                </style>
            </property>
        </case>
        <case value="false">
            <property name="lastName"
            type="string">
                <style>
                    <message
                    name="caption"
                    bundle="PersonMessages"
                    key="regular prefix"/>
                </style>
            </property>
        </case>
    </variant>
</property>
</entity>
```

A caption generated based on a model that includes an entity component shown in Table 6 reads "Mrs." if the default language for a computing application that consumes the model is English and if the value of the 'is Doctor' parameter is FALSE. When the value of the 'is Doctor' parameter is set to TRUE by the computing application, the caption is automatically switched to "Dr." If a user switches the language to French, the caption would automatically switch to "Docteur".

Message aspects in style components may also include token expressions and support tokenized messages. An example of a style component that includes a token expression is shown below in Table 6a. The ordersBundle file referenced in Table 6a may include the following entry "giftNoteError=Note must be ten characters or less. Your note is {0} characters long." The length of the Note at the time the error occurred would be substituted into the error message.

TABLE 6a

```
<property name="giftNote" type="string">
    <style>
        <validation expr="missing(value) or (len(value) <
        10) bundle="ordersBundle" key="giftNoteError"
        tokens="toString(len(giftNote))"/>
    </style>
</property>
```

A style component may also be used to define a mask to be associated with a property of an entity component of a model. In one example embodiment, a style component may define a display mask and/or an edit mask. A style display mask is used to specify the appearance of a property while it is presented for viewing on a display device. A style edit mask may be applied to a property in order to control how input values associated with the property are parsed. For example, an entity of a modeled component may include a property that represents a telephone number as a ten-character string type. A developer may wish the input field associated with the telephone number property to be in a format that includes the area code in parentheses followed by three digits, a dash, and another three digits, (e.g., "(408)-278-4040"). The developer may also wish to enforce this format such that an input is only accepted if the input data is provided in that format. An example of a style that provides a display mask and an edit mask according to the format described above is shown below in Table 7.

TABLE 7

```
<style name="phoneNumberStyle">
    <edit-mask>
        <mask>'('999')'-999-9999</mask>
    </edit-mask>
    <display-mask>
        <mask>'1'-999-999-9999</mask>
    </display-mask>
</style>
<entity name="ContactInfo">
    <property name="phone-number" type="string"
    style="phoneNumberStyle"/>
</entity>
```

In some embodiments, style components may be configured to support extensions. A style may specify one or more other styles that it extends. A style inherits all aspects of the styles that it extends, in declaration order, and overwrites or adds to the definition the aspects that it itself specifies. An example of a style extension is shown below in Table 8. As shown in Table 8, the bidAmount property gets its caption aspect from the bidType style and its validation aspects from both the positiveInteger and lessThanMillion styles.

TABLE 8

```
<style name="lessThanMillion">
    <validation expr="property < 1000000"/>
```

TABLE 8-continued

```
    </style>
    <style name="bidAmount" extends="lessThanMillion">
        <message name="caption" bundle="Auction"
        key="bid_amount"/>
        <message name="description" bundle="Auction"
        key="bid_amount"/>
    </style>
    <style name="positiveInteger">
        <validation expr="property > 0"/>
    </style>
    <entity name="AuctionBid">
        <property name="bidAmount" type="integer">
            <style extends="bidAmount, positiveInteger">
                <message name="description"
                bundle="SilentAuction" key="silent_bid_amount"/>
            </style>
        </property>
    </entity>
```

Example system and method for providing a modeled component may be described with reference to an environment illustrated in FIG. 3. The environment 300 may include an integrated development environment (IDE) 310 and a runtime application 320. Modeled components may be created in the IDE 310. The code generated by the IDE 310 is compiled and made available to a runtime application 320 as a form of a consumable model. The IDE 310 and the runtime application 320 may reside at different computer systems that may communicate via a communications network (not shown). The communications network may be a public network (e.g., the Internet, a wireless network, a public switched telephone network (PSTN), etc.) or a private network (e.g., LAN, WAN, Intranet, etc.). There is no actual communication with the IDE at runtime.

Figure 3:
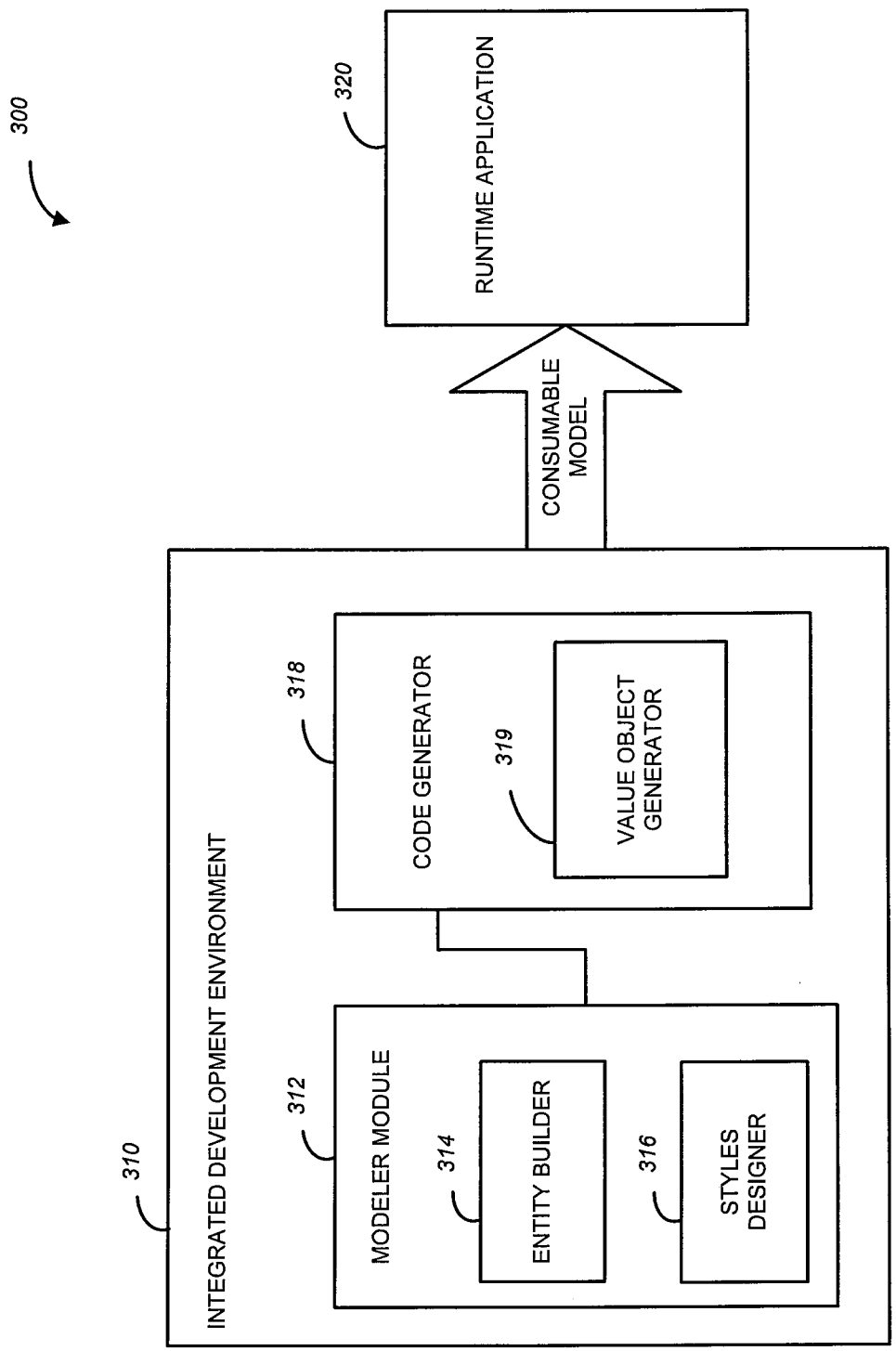
FIG. 3 is a block diagram showing an environment within which a method and system for providing modeled components may be implemented, in accordance with an example embodiment.

As shown in FIG. 3, the IDE 310 has an associated modeler module 312 and a code generator 318. The modeler module 312 may be configured to create modeled components (or models) and may include an entity builder 314 configured for building entity components and a styles designer 316 configured to create style components. A model created by the modeler module 312 is further processed by the code generator 318. In order to process any style components that have been included in a model, a value object generator 319 may be configured with a capability for processing styles. The processing of a model by the value object generator 319 results in a consumable model that can be provided to the runtime application 320. Some examples of the IDE 310 include, e.g., Adobe® Flash® Builder™ and Adobe® LiveCycle® ES2 Workbench provided by Adobe Systems Incorporated. Some examples of the runtime application 320 include, e.g., Flash® Player provided by Adobe Systems Incorporated and the Java™ Virtual Machine. Various modules that are utilized for creating and managing modeled components may be termed a modeling system. An example modeling system may be discussed with reference to FIG. 4.

Figure 4:
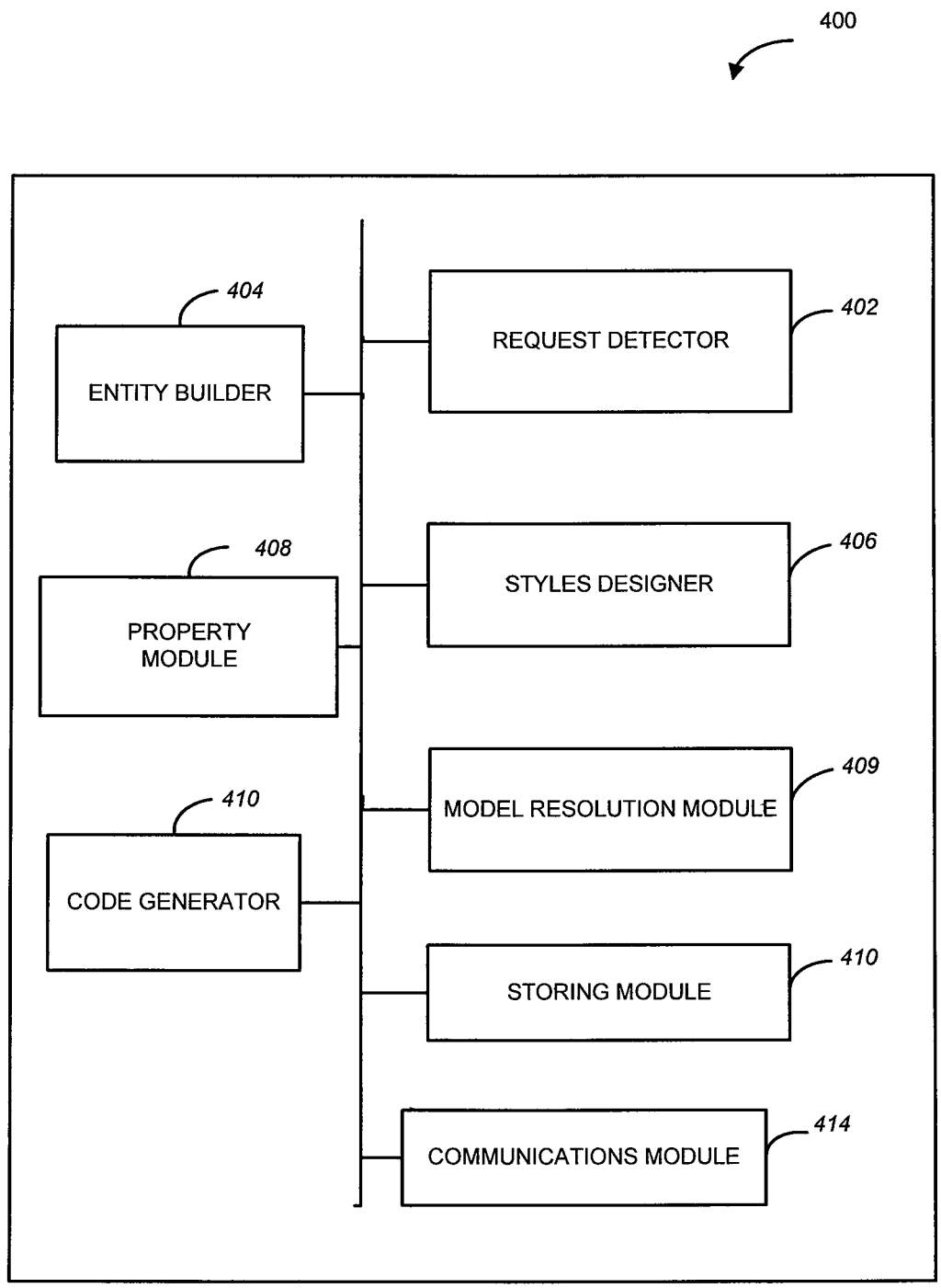
FIG. 4 is a block diagram illustrating a system for providing modeled components, in accordance with an example embodiment.

FIG. 4 is a block diagram illustrating a system 400 for providing modeled components, according to one example embodiment. As shown in FIG. 4, the system 400 includes a request detector 402, an entity builder 404, a styles designer 406, and a property module 408. The request detector 402 may be configured to receive requests to create modeled components. Requests may be received, e.g., via a user interface provided in the context of the IDE 310 shown in FIG. 3 or from another computing application. As described above and as illustrated in FIG. 1 and FIG. 2, a modeled component comprises one or more entity components (entities) that have one or more associated properties. An aspect of a property may refer to a style component that defines a user interface to be applied to the property. The entity builder 404 may be configured to create entities associated with models. The styles designer 406 may be configured to create style components. The styles designer 406 may permit specifying a style component at a model level or at a property level. When a style component is specified at a model level, the style component may be referenced from properties of multiple entities in the model. The property module 408 may be configured to associate a style component with one or more properties of one or more entities.

The system 400 may also include a model resolution module 409, a code generator 410, a storing module 412, and a communications module 414. The model resolution module 409 may be configured to create an in-memory representation of the modeled component. The code generator 410 may be configured to generate code, based on the in-memory representation of the modeled component that can be compiled and then provided to a runtime application. The storing module 412 may be configured to store the in-memory representation of the modeled component in a memory device. The communications module 414 may be configured to provide the modeled component to a runtime computing application (e.g., to the runtime application 320 shown in FIG. 3). The modules illustrated in FIG. 4 may be implemented as software, hardware, or a combination of both. Various operations performed by the system 400, according to an example embodiment, may be discussed with reference to FIG. 5.

Figure 5:
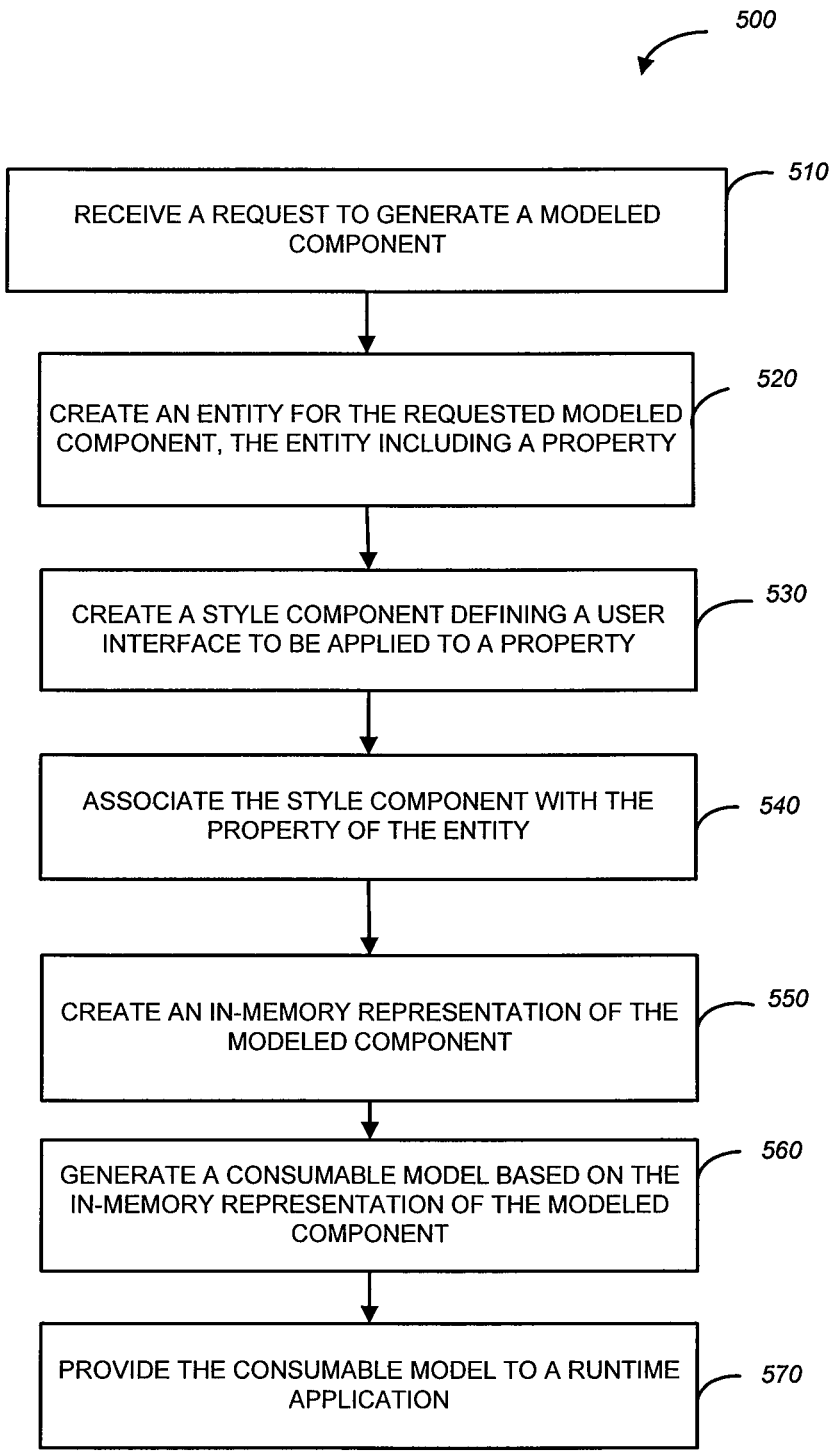
FIG. 5 is a flow chart illustrating a method for providing modeled components, in accordance with an example embodiment.

FIG. 5 is a flow chart illustrating a method 500 for providing modeled components, in accordance with an example embodiment. The method 500 may be performed by processing logic that may comprise hardware (e.g., dedicated logic, programmable logic, microcode, etc.), software (such as run on a general purpose computer system programmed to perform particular functions pursuant to instructions from program software or on a dedicated machine), or a combination of both. The processing logic, according to example embodiments, may reside in any of the modules shown in FIG. 4

As shown in FIG. 5, the method 500 commences with operation 510, where the request detector 402 of FIG. 4 receives a request to create a modeled component—a model comprising an entity that has a property associated with a style component. A request may be, e.g., a result of an input on the part of a human developer or input provided by another computing application. In response to the detected request, the entity builder 404 of FIG. 4 creates an entity for the requested model at operation 520. At operation 530, the styles designer 406 of FIG. 4 creates a style component that defines a user interface to be applied to the property of the entity in the requested model. At operation 540, the style component created by the styles designer 406 is associated with the property. As mentioned above, the style component may be specified at the property level. Alternatively, the style component may be specified at a model level, such that a property from another entity in the model may be associated with the user interface defined by the style component. At operation 550, the model resolution model 409 creates an in-memory representation of the model. The in-memory representation of the model may be stored by the storing module 412 of FIG. 4. The code generator 410 of FIG. 4, at operation 560, uses the in-memory representation of the model to generate code (e.g., classes) that can be compiled and used at runtime to represent the modeled component in a particular runtime application. At operation 570, the communications module 414 of FIG. 4 provides the modeled component to a runtime application.

Figure 6:
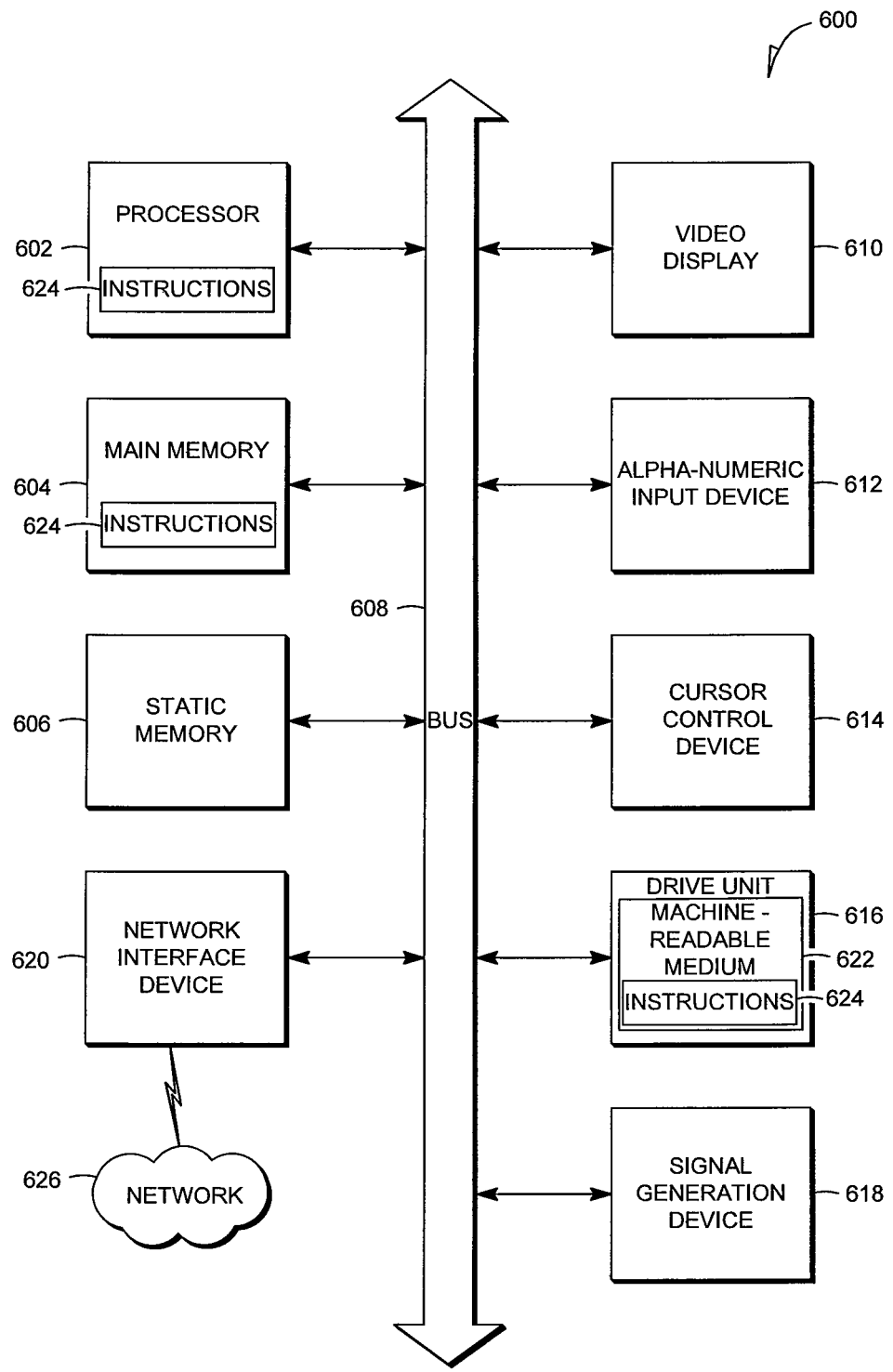
FIG. 6 is a diagrammatic representation of a machine in the example form of a computer system within which a set of instructions, for causing the machine to perform any one or more of the methodologies discussed herein, may be executed.

FIG. 6 is a diagrammatic representation of a machine in the example electronic form of a computer system 600 within which a set of instructions, for causing the machine to perform any one or more of the methodologies discussed herein, may be executed. In various embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a portable music player (e.g., a portable hard drive audio device such as an "Moving Picture Experts Group (MPEG) Layer 3" (MP3) player), a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 600 includes a processor 602 (e.g., a central processing unit (CPU), a graphics processing unit (GPU) or both), a main memory 604 and a static memory 606, which communicate with each other via a bus 608. The computer system 600 may further include a video display unit 610 (e.g., a liquid crystal display (LCD) or a cathode ray tube (CRT)). The computer system 600 also includes an alphanumeric input device 612 (e.g., a keyboard), a user interface (UI) cursor control device 614 (e.g., a mouse), a disk drive unit 616, a signal generation device 618 (e.g., a speaker) and a network interface device 620.

The disk drive unit 616 includes a computer-readable (or machine-readable) medium 622 on which is stored one or more sets of instructions and data structures (e.g., software 624) embodying or utilized by any one or more of the methodologies or functions described herein. The software 624 may also reside, completely or at least partially, within the main memory 604 and/or within the processor 602 during execution thereof by the computer system 600, the main memory 604 and the processor 602 also constituting machine-readable media.

The software 624 may further be transmitted or received over a network 626 via the network interface device 620 utilizing any one of a number of well-known transfer protocols (e.g., Hyper Text Transfer Protocol (HTTP)).

While the machine-readable medium 622 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing or encoding a set of instructions for execution by the machine and that cause the machine to perform any one or more of the methodologies of the present invention, or that is capable of storing or encoding data structures utilized by or associated with such a set of instructions. The term "machine-readable medium" shall accordingly be taken to include, but not be limited to, solid-state memories, optical and magnetic media. Such medium may also include, without limitation, hard disks, floppy disks, flash memory cards, digital video disks, random access memory (RAMs), read only memory (ROMs), and the like.

Thus, method and system for providing modeled components have been described. The embodiments described herein may be implemented in an operating environment comprising software installed on a computer, in hardware, or in a combination of software and hardware. Although embodiments have been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

The invention claimed is:

1. A computer-implemented method comprising:
   receiving a request to create a modeled component having a style component and an entity component;
   based at least in part on receiving the request to create the modeled component, using one or more processors, creating, in memory as separate components within the modeled component:
   the style component as a direct child of the modeled component, the style component defining an aspect of a user interface, wherein the creating of the style component further comprises creating, as a separate component within the modeled component an additional style component as a direct child of the modeled component, the additional style component defining an additional aspect of the user interface, wherein the style component extends the additional style component, and the reference to the style component further applying the additional aspect of the user interface defined by the additional style component to a property of the entity component based on the style component extending the additional style component; and
   the entity component representing a data type, the entity component including the property that includes an attribute referencing the style component, the reference to the style component applying the aspect of the user interface defined by the style component to the property of the entity component.

2. The method of claim 1, further comprising activating a modeler module, the modeler module comprising:
   an entity builder to create entity components; and
   a styles designer to create style components.

3. The method of claim 2, wherein the modeler module is a plug-in associated with an integrated development environment.

4. The method of claim 1, wherein the creating of the style component comprises specifying the style component at a level of the modeled component.

5. The method of claim 1, wherein the style component is to validate a value of the property.

6. The method of claim 1, wherein the style component is to provide a message to be displayed with respect to the property.

7. The method of claim 1, wherein the style component is to provide a mask to be associated with a value of the property.

8. The method of claim 7, wherein the mask defines a display format of an input field associated with the property.

9. The method of claim 7, wherein the mask defines an edit format of an input field associated with the property.

10. A computer-implemented system comprising:
    a request detector to receive a request to create a modeled component having an extensible style component and an entity component;
    a styles designer to create the extensible style component as a direct child of the modeled component, the extensible style component defining an aspect of a user interface, wherein the styles designer creates an additional style component, the additional style component defining an additional aspect of the user interface, and the reference to the style component further applying the additional aspect of the user interface defined by the additional style component to a property of the entity component based on the style component extending the additional style component.

an entity builder to create the entity component representing a data type, the entity component including the property that includes an attribute referencing the extensible style component, the reference to the extensible style component applying the aspect of the user interface defined by the extensible style component to the property of the entity component, the extensible style component and the entity component being separate components;

a model resolution module to create an in-memory representation of the modeled component; and a storing module to store the in-memory representation of the modeled component in a memory device.

11. The system of claim 10, comprising a property module to associate the style component with one or more properties of one or more entities, the one or more properties of the one or more entities including the property of the entity component.

12. The system of claim 10, comprising a communications module to provide the modeled component to a runtime computing application.

13. The system of claim 10, wherein the styles designer is to specify the style component at a level of the modeled component.

14. The system of claim 10, wherein the style component is to validate a value of the property.

15. The system of claim 10, wherein the style component is to provide a message to be displayed with respect to the property.

16. The system of claim 10, wherein the style component is to provide a mask to be associated with a value of the property.

17. The system of claim 16, wherein the mask defines a display format of an input field associated with the property.

18. A non-transitory machine-readable medium having instruction data to cause a machine to:

create a modeled component, the modeled component comprising a style component and an entity component, as separate components within the modeled component, the style component as a direct child of the modeled component, the style component defining an aspect of a user interface, wherein the creating of the style component further comprises creating, as a separate component within the modeled component an additional style component as a direct child of the modeled component, the additional style component defining an additional aspect of the user interface, wherein the style component extends the additional style component, and the reference to the style component further applying the additional aspect of the user interface defined by the additional style component to a property of the entity component based on the style component extending the additional style component; and the entity component representing a data type, the entity component including the property that includes an attribute referencing the style component, the reference to the style component applying the aspect of the user interface defined by the style component to the property of the entity component;

a style component defining an aspect of a user interface and an entity component representing a data type that includes a property, the aspect of the user interface being applied to the property based at least in part on an attribute of the property referencing the style component; and create an in-memory representation of the modeled component.

* * * * *